W. E. SWARTOUT.
PRECISION MEASURING INSTRUMENT.
APPLICATION FILED JUNE 24, 1921.
1,427,132.   Patented Aug. 29, 1922.
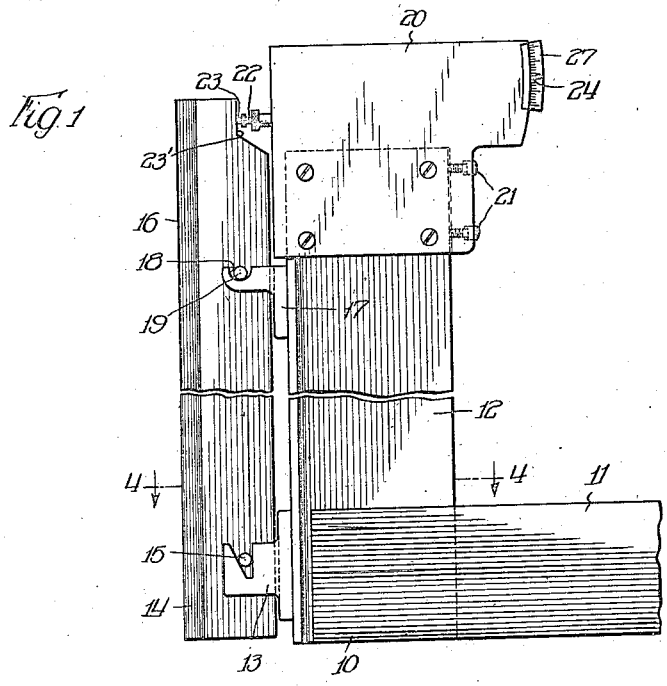
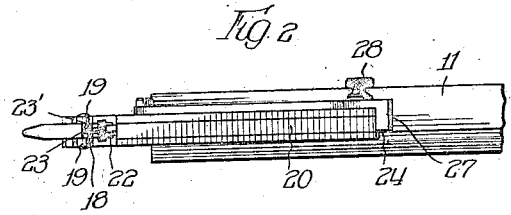
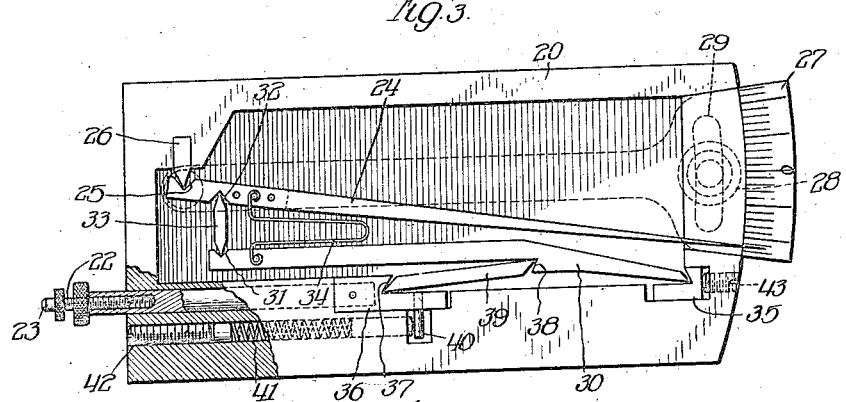
Witness:
R. Burkhardt.
Inventor:
William E. Swartout,
By Wilkinson, Hadley, Byron & Knight
attys

UNITED STATES PATENT OFFICE.

WILLIAM E. SWARTOUT, OF CHICAGO, ILLINOIS.

PRECISION MEASURING INSTRUMENT.

1,427,132.  Specification of Letters Patent.  Patented Aug. 29, 1922.

Application filed June 24, 1921. Serial No. 479,993.

*To all whom it may concern:*

Be it known that I, WILLIAM E. SWARTOUT, a citizen of the United States, residing at Chicago, in the county of Cook and State of Illinois, have invented certain new and useful Improvements in Precision Measuring Instruments, of which the following is a specification.

The present invention relates to precision measuring instruments.

The invention is illustrated and described in connection with a mechanic's square and is useful in precision work where lines or surfaces are to be brought into precise right angular relation. The invention also contemplates a structure by means of which the degree of divergence from a right angle relation may be accurately indicated.

In its broader aspects the invention is useful in connection with angles other than right angles though perhaps it finds its greatest field of applicability in connection with squares. For this reason, the invention for the purpose of convenience is described in connection with squares.

An object of the present invention is to provide a precision measuring instrument which may be readily set to indicate a predetermined angle with great accuracy.

A further object is to provide a precision instrument which will, with great accuracy, measure the divergence of two members from a predetermined angle.

A further object is to provide a device which may be used as an auxiliary to squares, as at present known and used, whereby to permit the use of said squares in work of very great refinement.

A further object is to provide micrometer mechanism which will clearly indicate small differences, which will be little subject to wear and which, though sensitive in its action, presents very little likelihood of getting out of order.

Further objects will appear as the description proceeds.

Referring to the drawings—

Figure 1 represents a square having an embodiment of the present invention applied thereto.

Figure 2 is a plan view of the mechanism shown in Figure 1.

Figure 3 is a view on an enlarged scale of the micrometer mechanism shown in Figure 1, parts being removed to show the internal mechanism.

Figure 4 is a cross-sectional view taken along the line 4—4 of Figure 1.

The numeral 10 indicates a square such as may be used by artisans in setting up their work. Said square 10 is provided with a leg 11 and a leg 12, the outer edges of which will lie more or less closely at right angles to one another. Mounted on the outer edge of the leg 12 is a bifurcated supporting member 13, which is adapted to straddle and support the straight edged member 14, the member 14 being provided with a pin 15, for this purpose, adapted to rest within a slot in the supporting member 13. The member 14 should have an edge, indicated by the numeral 16, which should be a straight line. A second bifurcated supporting member 17 will be mounted on the leg 12 vertically from the supporting member 13, which supporting member 17 will be grooved, as indicated at 18 for the reception of a pin 19 extending laterally on both sides of the straight edged member 14. The pin 19 rides loosely in the grooves 18 in the supporting member 17. The supporting member 17 merely serves the purpose of preventing the straight edged member 14 from moving too far from the leg 12.

Suitably mounted upon the leg 12 of the square 10 is a micrometer device 20. Said micrometer device 20 may be slotted for the reception of the leg 12 and may be held in position on said leg 12 by means of the set screws 21—21. The device 20 has a longitudinally movable yieldable member 22 provided with an adjustable contact point 23. The contact point 23 is adapted to engage the inside surface 23' of the straight edged member 14. The surface 23', the center line of the pin 18 and the center line of pin 15 should preferably lie in a single plane.

Referring now to Figure 3, it will be noted that the device 20 is provided with a pointer 24, having a notch 25, constituting a fulcrum seat for a knife edged fulcrum 26, which knife edge constitutes the axis of rotation of the pointer 24. The numeral 27 indicates a scale adjustably mounted to have a movement of rotation about said axis. Said scale 27 may be held in adjusted position by means of the thumb screw 28, which is threaded into member 20 and which rides in a slot 29 in the pivoted supporting member for scale 27. Fulcrumed at a point adjacent to the zone of the path of movement of the outer end of the pointer 24 is an operating member 30. The left hand end portion of the member 30 is notched, as indicated at 31. The pointer 24 is also notched at the point 32 lying near to the fulcrum 26 but between said fulcrum and the outer end of the pointer 24. A fulcrum member 33 is provided with a pair of knife edges at its opposite ends, which knife edges engage with the notches 31 and 32 in the operating member 30 and pointer 24 respectively. Said fulcrum member 33 communicates movement from the operating member 30 to the pointer 24, and should normally lie with its center line tangential to the circle of movement of the seat of the notch 31. A spring 34 is provided which biases the member 30 and the pointer 24 to positions in proximity to one another. A hardened steel fulcrum member 35 is provided at the right hand end of the device 20 for providing a fulcrum seat for member 30.

The longitudinally movable member 22 is provided with a head 36, notched as indicated at 37. The operating member 30 is notched as indicated by the numeral 38. Said notches 37 and 38 provide fulcrum seats for a link member 39, which is provided with knife edges at both ends thereof for action in said fulcrum seats 37 and 38. The head member 36 may be provided with a stud 40, which provides an abutment for adjusting the spring 41. The tension of the spring 41 may be adjusted by means of the screw 42. Position of the member 35 may be adjusted by means of the screw 43.

A mode of operation of the above described embodiment of the present invention is substantially as follows:

The instrument will be adjusted, by test, so that the edge 16 will lie at perfect right angles to the under side of leg 11. The scale 27 will be adjusted so that the pointer 24 lies on the zero mark. Thereafter when it is desired to test the angularity between any two members, the leg 11 of the square will be placed in contact with one of said members and the edge 16 of the member 14 will be placed in contact with the other of said members. If the member 14 under these circumstances makes an angle with the leg 11, which is more than a right angle, the spring 34 will urge the pointer 24 into proximity with the operating member 30 moving the pointer 24 from the zero mark on the scale. The scale 27 will be graduated, whereby to indicate at once the deviation from the true right angular relation. If, on the other hand, the member 14 under similar circumstances, assumes an angular relation with the leg 11 which is less than a right angle, the contact point 23 will be moved in a right hand direction, as viewed in Figure 3 resulting in the raising of pointer 24.

The pin 15 will be so located that gravity will carry the top of member 14 away from member 20. Therefore, the top portion of straight edged member 14 will come into contact with the work first. As the instrument is moved toward the work it finally comes to a solid stop at the lower end. Then if the angle between the straight edge 16 and the lower edge of member 12 varies from 90 degrees, the indicator 24 will correspondingly vary from the zero mark.

The link 39 and operating member 30 constitute two arms of a toggle mechanism. Movement of the member 22 in a right hand direction will have the effect of increasing the angular relation between the two arms 30 and 39 of the toggle, whereby the operating member 30 will be moved in a clockwise direction. Preferably the angle between the plane passing through the operating knife edges of the link 39 and the line of movement of the member 22, should be relatively small. This angle should be chosen of a value such that the sine thereof varies with substantial uniformity with variations in said angle. In practice it has been determined that the angular relation between the plane connecting the operating knife edges of the link 39 and the line of movement of member 22 may be in the neighborhood of 10 degrees.

Movement of operating member 30 in a clockwise direction will communicate motion to the pointer 34 through the link 33, which is in fulcruming relation between said member 30 and said pointer 24. Inasmuch as the link 33 applies force to the pointer 24 close to the fulcrum point thereof and is applied to the operating member 30 at a point near the outer end thereof, the advantage will be produced that small increments of movement of the member 22 will result in large changes in the position of the pointer 24 relative to the scale 27.

It will be noted that no pivots are provided in the micrometer mechanism 20, the various members of said mechanism having knife edge fulcruming engagement with one another. Said members will be hardened, whereby wear will be inappreciable and at the same time friction and lost motion will be reduced to a minimum.

The spring 41 has the effect of counterbalancing the spring 34, and inasmuch as it is readily adjustable by means of the screw 42, the spring tension of the device may be readily changed.

Inasmuch as the sine of the angle between the plane of the operating edges of the link 39 and the line of movement of the member 22 varies substantially uniformly with increments of movement of said member 22, the instrument will give substantially correct readings regardless of the operating position of the scale 27 within the limits in which a precision instrument of this nature is meant to perform. Any errors inherent in the mechanism will be inappreciable.

It will be obvious, of course, that the scale 27 may be kept in fixed relation to the member 20, all adjustments being accomplished by means of adjustable contact point 23. In this case the scale 27 may be graduated to measure changes in the position of member 22 with the greatest possible degree of accuracy.

One embodiment of the present invention has been described in detail. Many modifications will occur to those skilled in the art. It is intended in this patent to cover all such modifications that come within the scope of the invention as defined by the appended claims.

What I claim as new and desire to secure by Letters Patent in the United States, is:

1. An instrument having two side edges angularly placed relative to one another, a straight edged member fulcrumed on said instrument adjacent to one of said edges, and measuring means mounted on said instrument for accurately indicating the angularity between said straight edged member and the other of said edges, said measuring means being provided with a yielding member abutting said straight edged member, said measuring means being provided with means for visually indicating said angularity.

2. In combination, a square, an auxiliary straight edge, means for fulcruming said straight edge to occupy a position along one leg of said square and a measuring device on said leg having a yielding member abutting said straight edge, said measuring device being provided with a member for giving a visual indication of the position of said abutting member.

3. In combination, a square, an auxiliary straight edge, means for fulcruming said straight edge to occupy a position along one leg of said square and a measuring device on said leg, said measuring device having a yieldable member for abutting said straight edge to oppose pivotal movement of same in one direction and means for multiplying movement of said yieldable member for indicating purposes.

4. A micrometer, comprising an indicator biased to a predetermined position, an operating member therefor, said operating member being an extended member lying throughout its length in proximity to the biased position of said indicator, said pointer and said member being fulcrumed at unadjacent ends and a fulcruming element mounted between adjacent end portions of said pointer and said member.

5. A micrometer, comprising an indicator biased to a predetermined position, an operating member therefor, said operating member being an extended member lying throughout its length in proximity to the biased position of said indicator, said indicator and said member being fulcrumed at unadjacent ends, a fulcruming element mounted between adjacent end portions of said pointer and said member and spring means for biasing said pointer to a position in proximity to said member.

6. In combination, a rotatable indicator fulcrumed at a point near one of its ends, an operating member fulcrumed at a point adjacent to the zone marking the path of movement of the other end portion of said indicator, fulcruming means for communicating motion from said member to said pointer, located to engage said pointer at a point near its axis of rotation and to engage said member at a point distant from its fulcrum point.

7. In combination, a rotatable pointer fulcrumed at a point near one of its ends, an operating member fulcrumed at a point adjacent to the zone marking the path of movement of the other end portion of said pointer, fulcruming means for communicating motion from said member to said pointer, located to engage said pointer at a point near its axis of rotation and to engage said member at a point distant from its fulcrum point, a movable member and a second fulcruming member for communicating motion from said longitudinally movable member to said operating member.

8. A micrometer, comprising a movable member, a fulcrumed member, a link for communicating movement from said first mentioned member to rotate said second mentioned member about its fulcrum point, said link having a range of movement within a relatively small angle with reference to the line of movement of said first mentioned member and a pointer controlled by said fulcrumed member.

9. Micrometer mechanism, comprising a movable member, an indicator, an operating member for said indicator fulcrumed for rotary movement, a link device between said first mentioned member and said operating member, having knife edge fulcruming engagement with said members, said device being located to operate in a range of angularity relative to the line of movement of said longitudinally movable member in which the sine of the angle varies closely in proportion to the angle.

10. Micrometer mechanism, comprising an indicator and an operating member therefor and a device for moving said operating member, said member and said device forming a toggle joint, of which said operating member has a relatively fixed fulcrum point, means whose position is to be indicated, said device being fulcrumed between said means and said operating member.

11. Micrometer mechanism, comprising an operating member and a device for moving same, said member and said device forming a toggle joint, of which said operating member has a relatively fixed fulcrum point, means whose position is to be indicated, said device being fulcrumed between said means and said operating member and means for multiplying the movement of said operating member comprising a fulcrumed pointer and a double knife edged link between one end of said operating member and a part of said pointer near the fulcrum point thereof.

12. In combination, a square, a straight edged member fulcrumed thereon to occupy a position adjacent to one leg of said square, and a micrometer mechanism secured to said leg, said micrometer mechanism having a yieldable member for engaging said straight edged member and indicating means for giving visual indications of minute differences in the position of said yieldable member.

13. A micrometer mechanism, comprising a toggle mechanism of which one arm has a relatively fixed abutment, means for moving the other arm whereby to vary the angularity between said arms, said first mentioned arm having an extension, a fulcrumed indicator and means for communicating motion from said extension to said indicator.

Signed at Chicago, Illinois, this 16th day of June, 1921.

WILLIAM E. SWARTOUT.